(12) United States Patent
Ogawa et al.

(10) Patent No.: US 8,997,950 B2
(45) Date of Patent: Apr. 7, 2015

(54) VIBRATION CONTROL DEVICE FOR RAILROAD VEHICLE

(75) Inventors: Takayuki Ogawa, Sagamihara (JP); Jun Aoki, Sagamihara (JP); Masaru Uchida, Sagamihara (JP); Chie Yabuki, Sagamihara (JP)

(73) Assignee: Kayaba Industry Co., Ltd., Tokyo (JP)

( * ) Notice: Subject to any disclaimer, the term of this patent is extended or adjusted under 35 U.S.C. 154(b) by 3 days.

(21) Appl. No.: 13/991,849

(22) PCT Filed: May 30, 2012

(86) PCT No.: PCT/JP2012/063915
§ 371 (c)(1),
(2), (4) Date: Jun. 5, 2013

(87) PCT Pub. No.: WO2012/165471
PCT Pub. Date: Dec. 6, 2012

(65) Prior Publication Data
US 2013/0248306 A1    Sep. 26, 2013

(30) Foreign Application Priority Data

May 30, 2011   (JP) .................. 2011-120599

(51) Int. Cl.
| F16F 9/34 | (2006.01) |
| B61F 5/24 | (2006.01) |
| B61F 5/12 | (2006.01) |
| F15B 21/04 | (2006.01) |
| F16F 15/02 | (2006.01) |

(52) U.S. Cl.
CPC . *B61F 5/24* (2013.01); *B61F 5/127* (2013.01); *B61F 5/245* (2013.01); *F15B 21/04* (2013.01);
(Continued)

(58) Field of Classification Search
CPC ......... F16F 9/46; F16F 15/02; F16F 2222/02; B60G 2500/10; F15B 21/008; F15B 21/04; B61F 5/24; B61F 5/127; B61F 5/245

USPC ........ 188/266.2, 266.1, 266.3–266.5, 322.19; 60/469, 473, 477–479, 489
See application file for complete search history.

(56) References Cited

U.S. PATENT DOCUMENTS

| 4,972,762 | A | 11/1990 | Kubik |
| 2002/0184881 | A1* | 12/2002 | Oka ............................. 60/329 |
| 2011/0192157 | A1 | 8/2011 | Ogawa |

FOREIGN PATENT DOCUMENTS

| JP | 55-135210 A | 10/1980 |
| JP | 5-8005 U | 2/1993 |

(Continued)

OTHER PUBLICATIONS

European Search Report dated Feb. 9, 2015.

*Primary Examiner* — Pamela Rodriguez
(74) *Attorney, Agent, or Firm* — Rabin & Berdo, P.C.

(57) ABSTRACT

A vibration control device for railroad vehicle includes an actuator with a cylinder coupled to a truck of a railroad vehicle, a piston, a rod coupled to the piston and a vehicle body, a rod-side chamber and a piston-side chamber in the cylinder, a tank, a first on-off valve disposed at an intermediate position of a first passage communicating between the rod-side chamber and the piston-side chamber, a second on-off valve disposed at an intermediate position of a second passage communicating between the piston-side chamber and the tank, and a pump for supplying fluid to the rod-side chamber. A warm-up operation of the actuator is performed by opening the first and second on-off valves and driving the pump after the vibration control device is started and before a transition is made to a normal control mode for suppressing the vibration of the vehicle body.

8 Claims, 3 Drawing Sheets

(52) U.S. Cl.
CPC .................................. *F16F 15/02* (2013.01);
*F16F 2222/02* (2013.01); F15B 21/042
(2013.01); *F15B 2211/30505* (2013.01); *F15B 2211/3058* (2013.01); *F15B 2211/31529* (2013.01); *F15B 2211/31558* (2013.01); *F15B 2211/50518* (2013.01); *F15B 2211/5159* (2013.01); *F15B 2211/526* (2013.01); *F15B 2211/62* (2013.01)

(56) References Cited

FOREIGN PATENT DOCUMENTS

| | | |
|---|---|---|
| JP | 2009-035068 A | 2/2009 |
| JP | 2010-065797 A | 3/2010 |
| JP | 2011-088623 A | 5/2011 |
| KR | 10-2011-0052661 | 5/2011 |
| WO | WO-2010030025 A1 | 3/2010 |

* cited by examiner

VIBRATION CONTROL DEVICE FOR RAILROAD VEHICLE

TECHNICAL FIELD

The present invention relates to a vibration control device for railroad vehicle.

BACKGROUND ART

A vibration control device for railroad vehicle is known to be interposed between a vehicle body and a truck of a railroad vehicle and suppress vibration which acts on the railroad vehicle in a lateral direction with respect to a moving direction of the vehicle body.

JP2010-65797A discloses a vibration control device for railroad vehicle. This vibration control device for railroad vehicle includes a cylinder coupled to one of a truck and a vehicle body of a railroad vehicle, a piston slidably inserted in the cylinder, a rod inserted in the cylinder and coupled to the piston and the other of the truck and the vehicle body, a rod-side chamber and a piston-side chamber partitioned in the cylinder by the piston, a tank, a first on-off valve disposed at an intermediate position of a first passage communicating between the rod-side chamber and the piston-side chamber, a second on-off valve disposed at an intermediate position of a second passage communicating between the piston-side chamber and the tank, a pump for supplying hydraulic oil to the rod-side chamber, a discharge passage connecting the rod-side chamber to the tank and a variable relief valve disposed at an intermediate position of the discharge passage and capable of changing a valve opening pressure.

This vibration control device for railroad vehicle generates a thrust force in both extension and contraction directions and suppresses the vibration of the vehicle body with this thrust force by driving the pump, the first and second on-off valves and the variable relief valve.

SUMMARY OF THE INVENTION

When the railroad vehicle is in commercial service, the vibration control device for railroad vehicle drives the pump at a constant rotation speed and suppresses vehicle body vibration by appropriately driving the first and second on-off valves and the variable relief valve according to a vibrating state of the vehicle body. The railroad vehicle is stored in a barn until the commercial service is resumed after the commercial service is finished. During that time, the drive of the vibration control device for railroad vehicle is stopped.

Here, the vibration control device for railroad vehicle obtains a thrust force for suppressing the vibration of the vehicle body utilizing a hydraulic pressure, but is not driven until the commercial service is resumed after being finished. Thus, the temperature of the hydraulic oil in an actuator is low immediately after start. If the temperature of the hydraulic oil is low, the viscosity of the hydraulic oil is high and friction around a rotary shaft of the pump is high. Thus, a discharge flow rate of the pump becomes unstable and the thrust force of the actuator cannot be stabilized.

Further, in the case of feedback-controlling the thrust force generated by the actuator, a deviation of the thrust force becomes larger to possibly deteriorate the vehicle body vibration due to an unstable thrust force immediately after the vibration control device for railroad vehicle is started.

This invention aims to provide a vibration control device for railroad vehicle capable of effectively suppressing the vibration of a vehicle body by generating a stable thrust force.

According to one aspect of the present invention, a vibration control device for railroad vehicle for suppressing the vibration of a vehicle body of a railroad vehicle is provided which comprises an actuator including: a cylinder coupled to one of a truck and the vehicle body of the railroad vehicle, a piston slidably inserted in the cylinder, a rod inserted in the cylinder and coupled to the piston and the other of the truck and the vehicle body, a rod-side chamber and a piston-side chamber partitioned in the cylinder by the piston, a tank, a first on-off valve disposed at an intermediate position of a first passage communicating between the rod-side chamber and the piston-side chamber, a second on-off valve disposed at an intermediate position of a second passage communicating between the piston-side chamber and the tank, and a pump for supplying fluid to the rod-side chamber, wherein a warm-up operation of the actuator is performed by opening the first and second on-off valves and driving the pump after the vibration control device is started and before a transition is made to a normal control mode for suppressing the vibration of the vehicle body.

Embodiments of the present invention and advantages thereof are described in detail below with reference to the accompanying drawings.

EMBODIMENTS OF THE INVENTION

Figure 1:
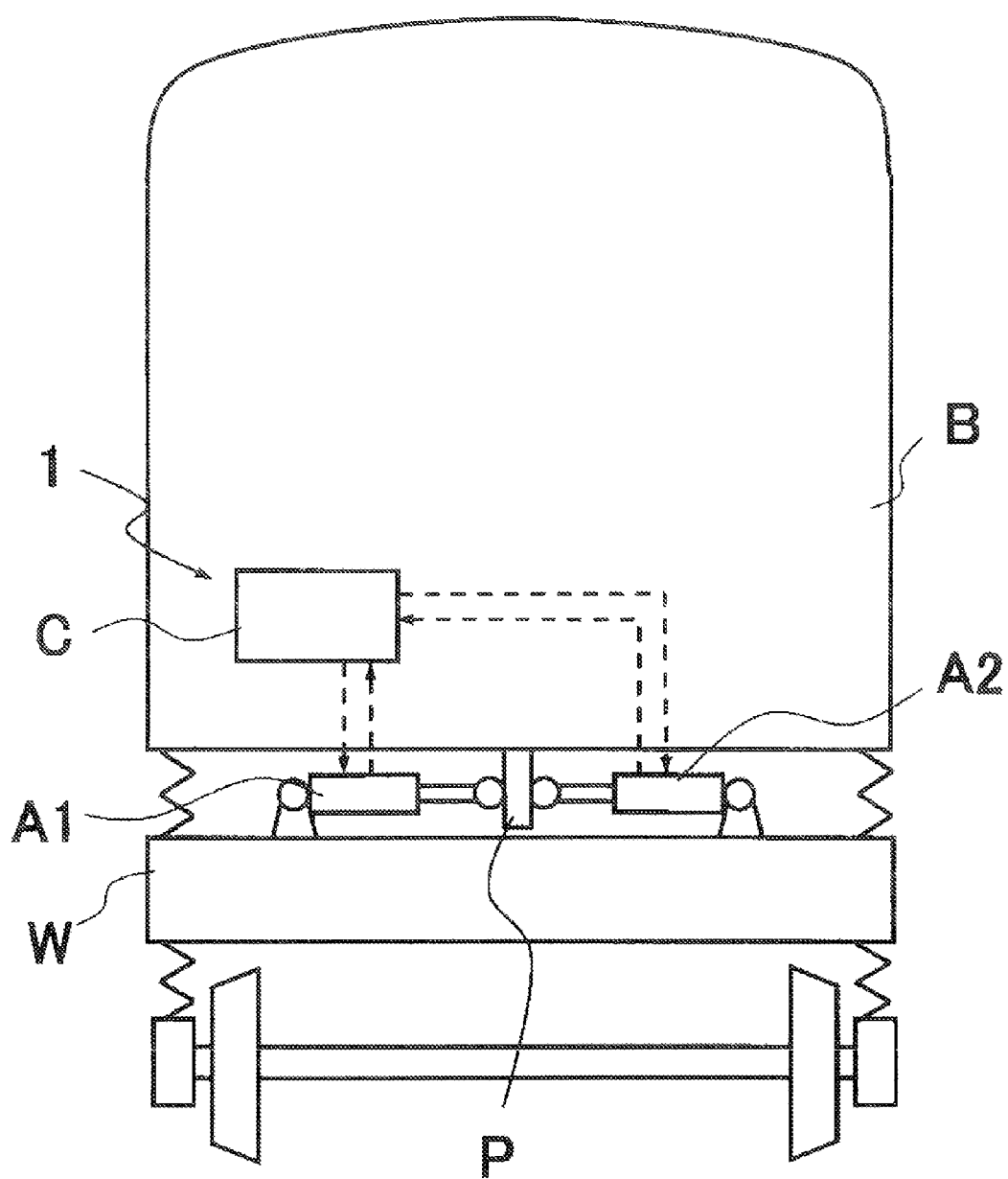
FIG. 1 is a sectional view of a railroad vehicle installed with a vibration control device for railroad vehicle according to an embodiment of the present invention.

A vibration control device for railroad vehicle 1 in this embodiment is used as a vibration control device for a vehicle body B of a railroad vehicle. The vibration control device for railroad vehicle 1 includes, as shown in FIG. 1, a pair of actuators A1, A2 interposed between a truck W and the vehicle body B and a controller C for controlling the actuators A1, A2. The actuators A1, A2 are coupled to a pin P hanging down from the vehicle body B of the railroad vehicle and paired and interposed in parallel between the vehicle body B and the truck W.

The actuators A1, A2 suppress the vibration of the vehicle body B in a lateral direction horizontal to a vehicle moving direction in a normal control mode. In the normal control mode, the controller C causes the actuators A1, A2 to generate thrust forces and suppresses the vibration of the vehicle body B in the lateral direction by executing a skyhook control.

In the normal control mode, the controller C obtains a speed of the vehicle body B in the lateral direction horizontal to the vehicle moving direction, calculates control force command values indicating thrust forces to be generated by the actuators A1, A2, and controls the actuators A1, A2 to generate the thrust forces as indicated by the control force command values, whereby the vibration of the vehicle body B in the lateral direction is suppressed.

A specific configuration of the actuators A1, A2 is described. It should be noted that since the actuators A1, A2 have the same configuration, only the actuator A1 is described and the actuator A2 is not described to avoid repeated description.

Figure 2:
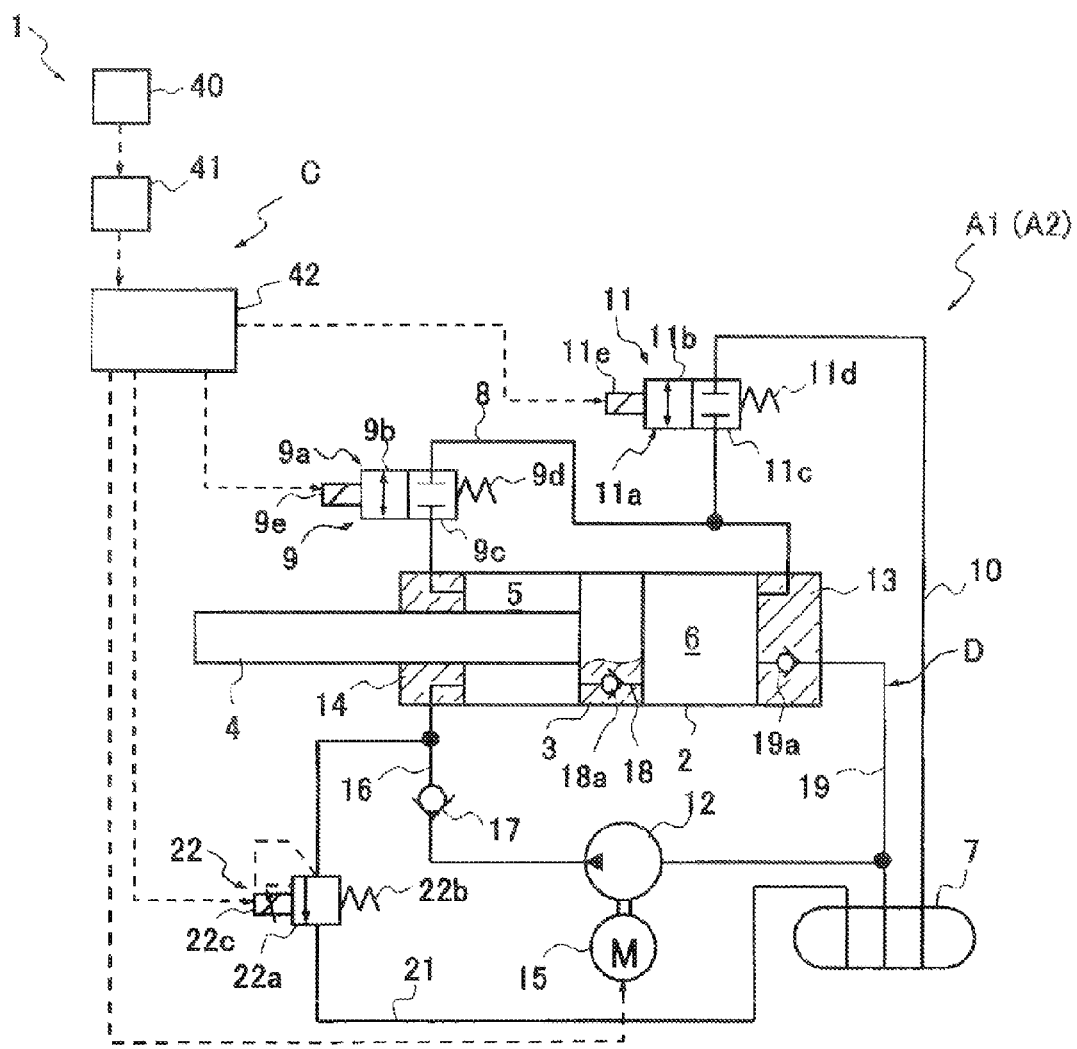
FIG. 2 is a detailed diagram of an actuator of the vibration control device for railroad vehicle according to the embodiment of the present invention.

As shown in FIG. 2, the actuator A1 is a single rod actuator including a cylinder 2 coupled to one of the truck W and the vehicle body B of the railroad vehicle, a piston 3 slidably inserted in the cylinder 2, a rod 4 inserted in the cylinder 2 and coupled to the piston 3 and the other of the truck W and the vehicle body B, a rod-side chamber 5 and a piston-side chamber 6 partitioned in the cylinder 2 by the piston 3, a tank 7, a first on-off valve 9 disposed at an intermediate position of a first passage 8 communicating between the rod-side chamber 5 and the piston-side chamber 6, a second on-off valve 11 disposed at an intermediate position of a second passage 10 communicating between the piston-side chamber 6 and the tank 7, a pump 12 for supplying fluid to the rod-side chamber 5, and a motor 15 for driving the pump 12.

Hydraulic oil as fluid is filled in the rod-side chamber 5 and the piston-side chamber 6 and gas is filled in the tank 7 in addition to the hydraulic oil. It should be noted that the gas in the tank 7 needs not be compressed and held in a pressurized state.

The actuator A1 is driven to extend by driving the pump 12 after the first on-off valve 9 is opened to set the first passage 8 in a communicating state and the second on-off valve 11 is closed to set the second passage 10 in a closed state. Further, the actuator A1 is driven to contract by driving the pump 12 after the second on-off valve 11 is opened to set the second passage 10 in a communicating state and the first on-off valve 9 is closed to set the first passage 8 in a closed state.

Each part of the actuator A1 is described in detail below.

The cylinder 2 is cylindrical, the right end thereof in FIG. 2 is closed by a lid 13 and a ring-shaped rod guide 14 is attached to the left end thereof in FIG. 2. A rod 4 movably inserted in the cylinder 2 is slidably inserted through the rod guide 14. One end of the rod 4 projects out from the cylinder 2 and the other end thereof is coupled to the piston 3 slidably inserted in the cylinder 2.

Sealing is provided between the outer periphery of the rod 4 and the rod guide 14 by an unillustrated seal member, whereby the interior of the cylinder 2 is held in a hermetically sealed state. Hydraulic oil is filled in the rod-side chamber 5 and the piston-side chamber 6 partitioned in the cylinder 2 by the piston 3.

Further, a cross-sectional area of the rod 4 is half that of the piston 3, and a pressure receiving area on the rod-side chamber 5 side of the piston 3 is set to be half that on the piston-side chamber 6 side of the piston 3. Further, if a pressure in the rod-side chamber 5 is equal when the actuator A1 is driven to extend and when the actuator A1 is driven to contract, thrust forces generated by both extension and contraction are set to be equal and a flow rate corresponding to a displacement amount of the actuator A1 is also equal when the actuator A1 extends and when the actuator A1 contracts.

When the actuator A1 is driven to extend, the rod-side chamber 5 and the piston-side chamber 6 communicate. Thus, the pressure in the rod-side chamber 5 and that in the piston-side chamber 6 become equal. In this case, the thrust force generated by the actuator A1 has a value obtained by multiplying a pressure receiving area difference between the rod-side chamber 5 side and the piston-side chamber 6 side on the piston 3 by the above pressure.

When the actuator A1 is driven to contract, the communication between the rod-side chamber 5 and the piston-side chamber 6 is blocked and the piston-side chamber 6 communicates with the tank 7. In this case, the thrust force generated by the actuator A1 has a value obtained by multiplying the pressure in the rod-side chamber 5 by the pressure receiving area on the rod-side chamber 5 side of the piston 3.

That is, the thrust force generated by the actuator A1 has a value obtained by multiplying half the cross-sectional area of the piston 3 by the pressure in the rod-side chamber 5 both when the actuator A1 extends and when the actuator A1 contracts. Accordingly, in the case of controlling the thrust force of the actuator A1, it is sufficient to control only the pressure in the rod-side chamber 5 both when the actuator A1 is driven to extend and when the actuator A1 is driven to contact. Since the pressure receiving area on the rod-side chamber 5 side of the piston 3 is set to be half that on the piston-side chamber 6 side of the piston 3, the pressure in the rod-side chamber 5 only has to be controlled to be the same value when the actuator A1 extends and when the actuator A1 contracts if the same thrust force is generated by extension and contraction. Thus, there is an advantage that response is equal when the actuator A1 extends and when the actuator A1 contracts since the flow rate in relation to the displacement amount is equal when the actuator A1 extends and when the actuator A1 contracts in addition to an advantage of simplifying the control.

It should be noted that it is same that the thrust force when the actuator A1 extends or contracts can be controlled by controlling the pressure in the rod-side chamber 5 even if the pressure receiving area on the rod-side chamber 5 side of the piston 3 is not set to be half that on the piston-side chamber 6 side of the piston 3.

The left end of the rod 4 in FIG. 2 and the lid 13 for closing the right end of the cylinder 2 include an unillustrated mounting portion, and the actuator A1 is interposed between the truck W and the vehicle body B of the railroad vehicle by this mounting portion.

The rod-side chamber 5 and the piston-side chamber 6 communicate via the first passage 8, and the first on-off valve 9 is disposed at the intermediate position of the first passage 8. It should be noted that although the first passage 8 communicates between the rod-side chamber 5 and the piston-side chamber 6 outside the cylinder 2, it may be provided in the piston 3.

The first on-off valve 9 is an electromagnetic on-off valve and includes a valve 9a having a communication position 9b where the first passage 8 is opened to communicate between the rod-side chamber 5 and the piston-side chamber 6 and a blocking position 9c where the communication between the rod-side chamber 5 and the piston-side chamber 6 is blocked, a spring 9d for biasing the valve 9a to assume the blocking position 9c, and a solenoid 9e for switching the valve 9a to the communication position 9b against a biasing force of the spring 9d when being energized.

The piston-side chamber 6 and the tank 7 communicate via the second passage 10. The second on-off valve 11 is disposed at the intermediate position of the second passage 10. The second on-off valve 11 is an electromagnetic on-off valve and includes a valve 11a having a communication position 11b where the second passage 10 is opened to communicate between the piston-side chamber 6 and the tank 7 and a blocking position 11c where the communication between the piston-side chamber 6 and the tank 7 is blocked, a spring 11d for biasing the valve 11a to assume the blocking position 11c, and a solenoid 11e for switching the valve 11a to the communication position 11b against a biasing force of the spring 11d when being energized.

The pump 12 is driven by the motor 15 and discharges the hydraulic oil only in one direction. A discharge port of the pump 12 communicates with the rod-side chamber 5 by a supply passage 16 and a suction port communicates with the tank 7. The pump 12 sucks the hydraulic oil from the tank 7 and supplies the hydraulic oil to the rod-side chamber 5 when being driven by the motor 15.

Since the pump 12 discharges the hydraulic oil only in one direction and needs not switch a rotation direction, there is no problem that a discharge amount changes when the rotation is switched and an inexpensive gear pump or the like can be used. Further, since the pump 12 constantly rotates in the same direction, the motor 15 which is a drive source for driving the pump 12 also constantly rotates in the same direction, high response to the switch of the rotation is not required and, accordingly, the inexpensive motor 15 can be used. It should be noted that a check valve 17 for preventing the flow of the hydraulic oil from the rod-side chamber 5 to the pump 12 is disposed at an intermediate position of the supply passage 16.

When the actuator A1 is extended in a state where the hydraulic oil is supplied at a predetermined discharge flow rate from the pump 12 to the rod-side chamber 5, the pressure in the rod-side chamber 5 is adjusted by opening the first on-off valve 9 and opening and closing the second on-off valve 11. Further, when the actuator A1 is contracted, the pressure in the rod-side chamber 5 is adjusted by opening the second on-off valve 11 and opening and closing the first on-off valve 9. In this way, a thrust force as indicated by the control force command value can be generated.

It should be noted that the first on-off valve 9 and the second on-off valve 11 may be variable relief valves having an opening and closing function capable of adjusting a valve opening pressure. In this case, it is possible to adjust the thrust force of the actuator A1 by adjusting the valve opening pressure instead of opening and closing the first on-off valve 9 or the second on-off valve 11 when the actuator A1 extends or contracts.

Further, the thrust force as indicated by the control force command value can also be generated by adjusting the discharge flow rate of the pump 12. In this case, the thrust force output by the actuator A1 can be measured if a pressure sensor for detecting the pressure in the rod-side chamber 5, a sensor for detecting a torque acting on the motor 15 or the rotary shaft of the pump 12, a load sensor for detecting a load acting on the rod 4 or a strain sensor for detecting a strain of the rod 4 is provided.

Although the thrust force of the actuator A1 can be adjusted as described above, the vibration control device for railroad vehicle 1 of this embodiment includes a discharge passage 21 connecting the rod-side chamber 5 and the tank 7 and a variable relief valve 22 disposed at an intermediate position of this discharge passage 21 and capable of changing the valve opening pressure so that the thrust force can be more easily adjusted.

The variable relief valve 22 is a proportional electromagnetic relief valve and includes a valve body 22a disposed at an intermediate position of this discharge passage 21, a spring 22b for biasing the valve body 22a to block the discharge passage 21 and a proportional solenoid 22c for generating a thrust force, which resists a biasing force of the spring 22b, when being energized. A valve opening pressure of the variable relief valve 22 is adjusted by adjusting the amount of a current flowing in the proportional solenoid 22c.

The variable relief valve 22 opens the discharge passage 21 when a pressure acting on the valve body 22a exceeds a relief pressure (valve opening pressure). Specifically, when the pressure in the rod-side chamber 5 upstream of the discharge passage 21 exceeds the relief pressure (valve opening pressure), a resultant force of a thrust force resulting from the above pressure for pushing the valve body 22a in a direction to open the discharge passage 21 and a thrust force generated by the proportional solenoid 22c surpasses the biasing force of the spring 22b biasing the valve body 22a in a direction to block the discharge passage 21. In this way, the valve body 22a is moved backward to open the discharge passage 21.

Further, the variable relief valve 22 is set to increase the thrust force generated by the proportional solenoid 22c as the current supplied to the proportional solenoid 22c increases, the valve opening pressure is minimized when the current supplied to the proportional solenoid 22c is maximized and, conversely, the valve opening pressure is maximized when no current is supplied to the proportional solenoid 22c at all.

Accordingly, if the pressure in the rod-side chamber 5 is adjusted to the valve opening pressure of the variable relief valve 22 in extending or contracting the actuator A1, the pressure in the rod-side chamber 5 can be easily adjusted by adjusting the valve opening pressure of the variable relief valve 22. By providing the discharge passage 21 and the variable relief valve 22 in this way, sensors necessary to adjust the thrust force of the actuator A1 become unnecessary. Further, it is not necessary to open and close the first and second on-off valves 9, 11 at a high speed, use variable relief valves with an opening and closing function as the first and second on-off valves 9, 11 and accurately control the motor 15 for the adjustment of the discharge flow rate of the pump 12. Thus, the vibration control device for railroad vehicle 1 becomes inexpensive and a robust system in terms of both hardware and software can be built.

It should be noted that the valve opening pressure can be easily controlled since a proportional electromagnetic relief valve capable of proportionally changing the valve opening pressure according to the amount of the supplied current is used as the variable relief valve 22, but the variable relief valve 22 is not limited to a proportional electromagnetic relief valve as long as being able to adjust the valve opening pressure.

Regardless of the open or closed states of the first and second on-off valves 9, 11, the variable relief valve 22 allows the pressure in the rod-side chamber 5 to escape to the tank 7 by opening the discharge passage 21 to allow the rod-side chamber 5 to communicate with the tank 7 if an excessive input is given to the actuator A1 in the extension or contraction direction and the pressure in the rod-side chamber 5 exceeds the valve opening pressure. Thus, the entire system of the actuator A1 can be protected. In this way, the system can be protected by providing the discharge passage 21 and the variable relief valve 22.

Further, the actuator A1 includes a damper circuit D. The damper circuit D causes the actuator A1 to function as a damper when the first and second on-off valves 9, 11 are closed. The damper circuit D includes a rectifying passage 18 which permits only the flow of the hydraulic oil from the piston-side chamber 6 toward the rod-side chamber 5 and a suction passage 19 which permits only the flow of the hydraulic oil from the tank 7 toward the piston-side chamber 6. Further, since the actuator A1 includes the discharge passage 21 and the variable relief valve 22, the variable relief valve 22 functions as a damping valve.

The rectifying passage 18 communicates between the piston-side chamber 6 and the rod-side chamber 5 and a check valve 18a is disposed at an intermediate position. The rectifying passage 18 is a one-way passage which permits only the flow of the hydraulic oil from the piston-side chamber 6 toward the rod-side chamber 5. The suction passage 19 communicates between the tank 7 and the piston-side chamber 6 and a check valve 19a is disposed at an intermediate position.

The suction passage 19 is a one-way passage which permits only the flow of the hydraulic oil from the tank 7 toward the piston-side chamber 6.

It should be noted that the function of the rectifying passage 18 can be consolidated into the first passage 8 by incorporating a check valve into the blocking position 9c of the first on-off valve 9 and the function of the suction passage 19 can be consolidated into the second passage 10 by incorporating a check valve into the blocking position 11c of the second on-off valve 11.

The damper circuit D links the rod-side chamber 5, the piston-side chamber 6 and the tank 7 one after another by the rectifying passage 18, the suction passage 19 and the discharge passage 21 when the both first and second on-off valves 9, 11 in the actuator A1 are switched to the blocking positions 9c, 11c. Since the rectifying passage 18, the suction passage 19 and the discharge passage 21 are one-way passages, the hydraulic oil is invariably discharged from the cylinder 2 when the actuator A1 is extended or contracted by an external force and the discharged hydraulic oil is returned to the tank 7 via the discharge passage 21. The hydraulic oil that becomes deficient in the cylinder 2 is supplied into the cylinder 2 from the tank 7 via the suction passage 19.

Since the variable relief valve 22 serves as resistance to this flow of the hydraulic oil and functions as a pressure control valve for adjusting the pressure in the cylinder 2 to the valve opening pressure, the actuator A1 functions as a passive uniflow damper. It should be noted that the damper circuit D may be configured by providing a passage connecting the rod-side chamber 5 and the tank 7 and a damping valve arranged at an intermediate position of this passage without providing the variable relief valve 22 and the discharge passage 21.

Further, in the event of such a failure that each device of the actuator A1 cannot be energized, the valves 9a, 11a of the first and second on-off valves 9, 11 are pushed by the springs 9d, 11d to be respectively switched to the blocking positions 9c, 11c, and the variable relief valve 22 functions as a pressure control valve having a valve opening pressure fixed at a maximum level. Thus, the actuator A1 automatically functions as a passive damper.

In the case of causing the actuator A1 to generate a desired thrust force in the extension direction, the controller C sets the first on-off valve 9 of the actuator A1 at the communication position 9b and the second on-off valve 11 at the blocking position 11c and supplies the hydraulic oil from the pump 12 into the cylinder 2 by rotating the motor 15 at a predetermined rotation speed according to an extended or contacted state of the actuator A1. In this way, the rod-side chamber 5 and the piston-side chamber 6 communicate, the hydraulic oil is supplied from the pump 12 to the both, the piston 3 is pushed to the left in FIG. 2 and the actuator A1 generates a thrust force in the extension direction.

Since the variable relief valve 22 is opened and the hydraulic oil escapes to the tank 7 via the discharge passage 21 if the pressure in the rod-side chamber 5 and the piston-side chamber 6 exceeds the valve opening pressure of the variable relief valve 22, the pressure in the rod-side chamber 5 and the piston-side chamber 6 is controlled to the valve opening pressure of the variable relief valve 22 determined by the current applied to the variable relief valve 22.

Thus, the actuator A1 generates an extension-direction thrust force corresponding to a value obtained by multiplying the receiving pressure area difference between the piston-side chamber 6 side and the rod-side chamber 5 side on the piston 3 by the pressure in the rod-side chamber 5 and the piston-side chamber 6 controlled by the variable relief valve 22.

Contrary to this, in the case of causing the actuator A1 to generate a desired thrust force in the contraction direction, the controller C sets the first on-off valve 9 of the actuator A1 at the blocking position 9c and the second on-off valve 11 at the communication position 11b and supplies the hydraulic oil from the pump 12 into the rod-side chamber 5 by rotating the motor 15 at a predetermined rotation speed according to the extended or contacted state of the actuator A1. In this way, the piston-side chamber 6 and the tank 7 communicate and the hydraulic oil is supplied from the pump 12 to the rod-side chamber 5, wherefore the piston 3 is pushed to the right in FIG. 2 and the actuator A1 generates a thrust force in the contraction direction.

Similarly, by adjusting the current of the variable relief valve 22, the actuator A1 generates a contraction-direction thrust force corresponding to a value obtained by multiplying the pressure receiving area on the rod-side chamber 5 side of the piston 3 and the pressure in the rod-side chamber 5 controlled by the variable relief valve 22.

Since the thrust force can be adjusted by rotating the motor 15 at the predetermined constant rotation speed since the discharge passage 21 and the variable relief valve 22 are provided in this embodiment, the rotation speed of the pump 12 needs not be changed, the generation of noise associated with a variation of the rotation of the pump 12 can be prevented and control response of the actuator A1 can be improved. It should be noted that the thrust force generated by the actuator A1 can also be adjusted by adding a change in the rotation speed of the motor 15 to the pressure adjustment by the variable relief valve 22.

Further, since the actuator A1 can function not only as an actuator, but also as a damper only by opening and closing the first and second on-off valves 9, 11 regardless of a driven state of the motor 15, response and reliability of the system can be improved without necessitating a cumbersome and sudden valve switching operation.

It should be noted that since the actuator A1 is of a single rod type, a sufficient stroke length can be more easily ensured as compared with a double-rod actuator, and ease of mounting into the railroad vehicle can be improved by shortening the entire length of the actuator.

Further, since the hydraulic oil is supplied from the pump 12 and the flow of the hydraulic oil is finally returned to the tank 7 after successively passing the rod-side chamber 5 and the piston-side chamber 6 by the extension and the contraction in the actuator A1, even if gas enters the rod-side chamber 5 or the piston-side chamber 6, the gas is automatically discharged to the tank 7 by the extension and contraction of the actuator A1, whereby the deterioration of the response in generating the thrust force can be prevented.

Accordingly, cumbersome assembling in oil and assembling under a vacuum environment are not forced and accurate degassing of hydraulic oil is not necessary in manufacturing the actuator A1, wherefore productivity is improved and manufacturing cost can be reduced.

Further, even if gas enters the rod-side chamber 5 or the piston-side chamber 6, the gas is automatically discharged to the tank 7 by the extension and contraction of the actuator A1. Thus, it is not necessary to frequently carry out maintenance for performance recovery and labor and cost burden in maintenance aspect can be reduced.

Figure 3:
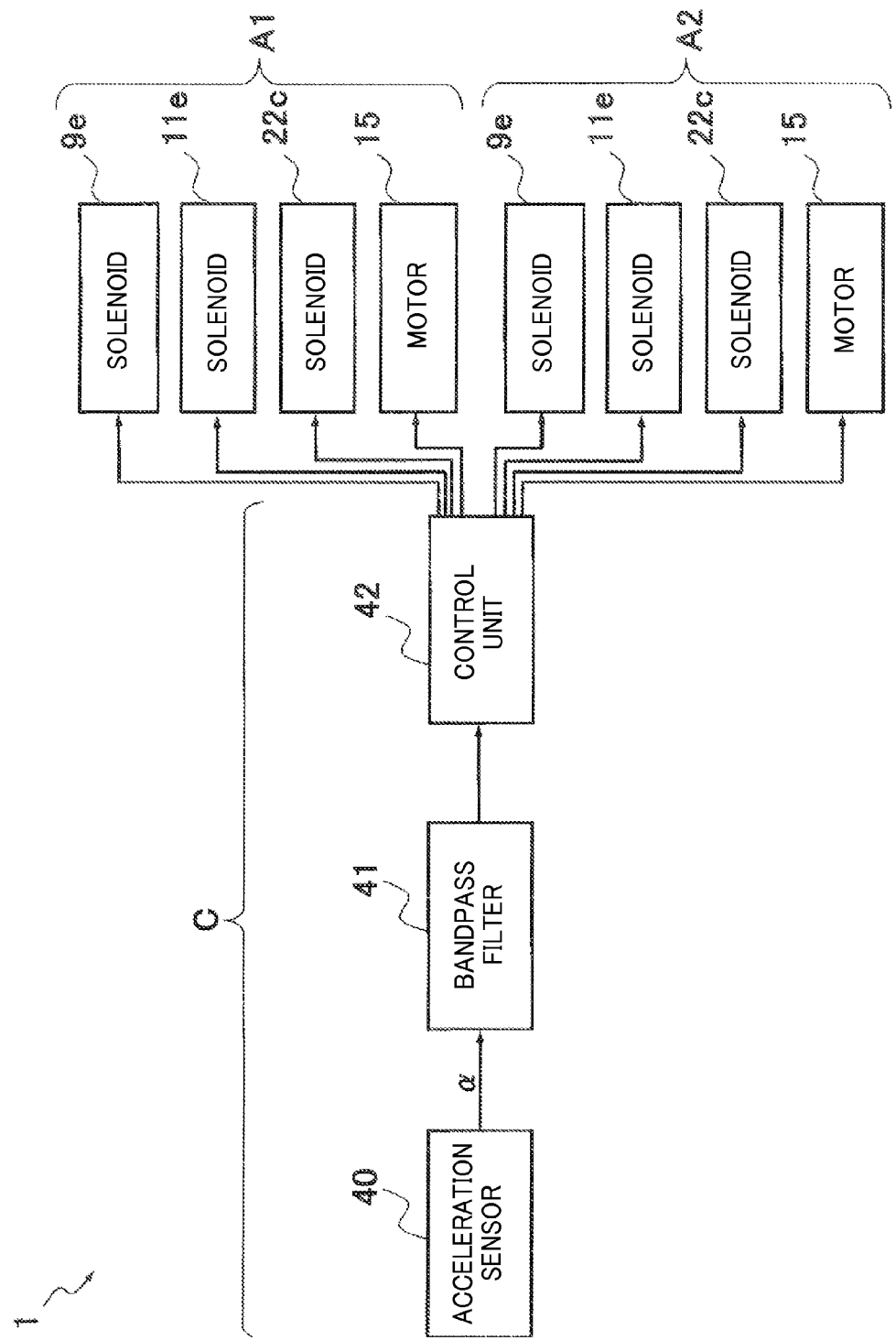
FIG. 3 is a control block diagram of a controller in the vibration control device for railroad vehicle according to the embodiment of the present invention.

As shown in FIGS. 1 to 3, the controller C includes an acceleration sensor 40 for detecting a lateral acceleration α in a lateral direction horizontal to the vehicle moving direction of the vehicle body B, a bandpass filter 41 for removing a steady-state acceleration, a drift component and noise during running on a curve included in the lateral acceleration α, and a control unit 42 for processing the lateral acceleration α filtered by the bandpass filter 41 and outputting a control command to the motor 15, the solenoid 9e of the first on-off valve 9, the solenoid 11e of the second on-off valve 11, the proportional solenoid 22c of the variable relief valve 22 of each of the actuators A1, A2.

In the normal control mode, the thrust force of each actuator A1, A2 is controlled as described below. It should be noted that since the steady-state acceleration during running on a curve included in the lateral acceleration α is removed in the bandpass filter 41, only vibration which deteriorates ride comfort can be suppressed.

The control unit 42 calculates a lateral velocity of the vehicle body B by integrating the lateral acceleration α detected by the acceleration sensor 40. The lateral velocity is calculated, for example, as follows: a velocity in a leftward direction of FIG. 1 as a positive value and a velocity in a rightward direction of FIG. 1 as a negative value. It should be noted that another sensor or the like may be used to calculate the lateral velocity of the vehicle body B.

The control unit 42 calculates a control force command value composed of the magnitudes and directions of a thrust force to be generated by the actuator A1, A2 by multiplying the lateral velocity by a skyhook gain in accordance with a skyhook control law.

After calculating the control force command values, the control unit 42 gives control commands to the actuators A1, A2 to cause these actuators A1, A2 to generate thrust forces as indicated by the control force command values. Specifically, the control unit 42 obtains a control command to be given to the motor 15, the solenoid 9e of the first on-off valve 9, the solenoid 11e of the second on-off valve 11, the proportional solenoid 22c of the variable relief valve 22 of each of the actuators A1, A2 from the control force command value and outputs this control command. Further, in obtaining the control commands from the control force command value, the control command may be obtained by feeding back the thrust force currently output by the actuator A1, A2.

As described above, in the normal control mode, the controller C samples the lateral velocity in a predetermined sampling time cycle, performs the above process and continuously performs the process for calculating the control force command value and controlling the thrust force of each actuator A1, A2.

Here, the vibration control device for railroad vehicle 1 warms up the actuators A1, A2 for a predetermined time before the device 1 is turned on in a stopped state to start and transitions to the normal control mode.

In this case, in warming up one A1 (A2) of the two actuators A1, A2, the other actuator A2 (A1) is caused to function as a damper.

In the warm-up operation, in each of the actuators A1, A2, the pump 12 is driven by the motor 15 and the valve opening pressure of the variable relief valve 22 is minimized after the first and the second on-off valves 9, 11 are opened.

This causes the hydraulic oil discharged from the pump 12 to return to the tank 7 via the discharge passage 21. Since both the first and second on-off valves 9, 11 are open, the rod-side chamber 5 and the piston-side chamber 6 communicate with the tank 7. Since the pressure in the rod-side chamber 5 and the piston-side chamber 6 is maintained at a tank pressure, the actuator A1, A2 does not generate any thrust force either in the extension direction or in the contraction direction. Thus, the vehicle body B is not vibrated by the actuators A1, A2 as the warm-up operation is performed.

It should be noted that a time required for the warm-up operation is determined in advance, for example, by average temperature in each season in an area where the railroad vehicle is used. In this case, the time for the warm-up operation is set to be longer in winter than in summer.

The warm-up operation is finished after the elapse of a predetermined time and the vibration control device for railroad vehicle 1 transitions to the normal control mode. Since the temperature of the hydraulic oil in the actuators A1, A2 increases by performing the warm-up operation, the actuators A1, A2 can be caused to generate intended thrust forces after the transition to the normal control mode.

Further, the warm-up operation may be finished and a transition may be made to the normal control mode when the temperature of the hydraulic oil reaches a temperature at which the actuators A1, A2 can generate set thrust forces. In this case, the temperature of the hydraulic oil is monitored and the warm-up operation is finished when the temperature of the hydraulic oil reaches a temperature at which the warm-up operation may be finished. The temperature of the hydraulic oil may be, for example, detected by a temperature sensor for detecting the temperature of the hydraulic oil in the tank 7 and the temperature may be monitored by the control unit 42.

It should be noted that since the first and second on-off valves 9, 11 are open and the rod-side chamber 5 and the piston-side chamber 6 are maintained at the tank pressure, a state where the actuators A1, A2 generate no thrust force can be maintained even without minimizing the valve opening pressure of the variable relief valve 22. However, there is a possibility that a slight pressure difference is generated between the rod-side chamber 5 and the piston-side chamber 6 due to pipe resistance and the actuators A1, A2 generate a thrust force in the contraction direction. Accordingly, the pressure at the upstream side of the rod-side chamber 5 is actually reduced by minimizing the valve opening pressure of the variable relief valve 22, thereby reliability preventing the actuators A1, A2 from generating any thrust force during the warm-up operation.

According to the vibration control device for railroad vehicle 1 of this embodiment, the warm-up operation of the actuators A1, A2 is performed after the device 1 is started and before a transition is made to the normal control mode in which the vibration of the vehicle body B is suppressed. Thus, a problem that generated thrust forces become unstable and cannot effectively suppress vehicle body vibration since the temperature of the hydraulic oil in the actuators A1, A2 is too low can be solved. Specifically, in this embodiment, the temperature of the hydraulic oil in the actuators A1, A2 reaches a temperature suitable for vibration suppression before a transition is made to the normal control mode, thrust forces generated by the actuators A1, A2 are stabilized and vehicle body vibration can be effectively suppressed.

Further, since the actuators A1, A2 generate no thrust force during the warm-up operation, there is no likelihood that the vehicle body B is vibrated as the warm-up operation is performed and energy is uselessly consumed.

It should be noted that, in this embodiment, two actuators A1, A2 are provided, the other actuator A2 is caused to function as a damper in warming up the one actuator A1, and the one actuator A1 is caused to function as a damper in warming up the other actuator A2.

In the actuator caused to function as the damper, the first and second on-off valves 9, 11 are closed and the pump 12 is stopped. The variable relief valve 22 is not energized or a current is adjusted to achieve a valve opening pressure at which a requested damping force can be generated in the case of causing the actuator A2 to function as the damper.

Then, the vibration of the vehicle body B is suppressed by the actuator functioning as the damper even if a certain external force acts on the vehicle body B and the truck W during the warm-up operation, wherefore it is possible to completely prevent the vehicle body B from freely laterally moving and the warm-up operation can be safely performed.

It should be noted that although the two actuators A1, A2 are provided in this embodiment, three or more actuators may be provided. In this case, if other actuator(s) is/are warmed up while at least one actuator is caused to function as a damper, it is possible to completely prevent the vehicle body B from freely laterally moving and the warm-up operation can be safely performed. For example, out of three actuators, two actuators are first warmed up and the remaining one is caused to function as a damper. Subsequently, the actuator which has not been warmed up yet is warmed up and one or more of the two already warmed-up actuators may be caused to function as a damper.

When the warm-up operation for all the actuators A1, A2 is finished, the controller C transitions to the normal control mode. Before transitioning to the normal control mode, the controller C may perform a self-diagnosis to determine whether or not there is any abnormality in the vibration control device for railroad vehicle 1.

In the self-diagnosis, whether or not the actuator A1, A2 extends or contracts is monitored and abnormality is judged when it extends or contracts in the case of changing the valve opening pressure of the variable relief valve 22 by opening the first and second on-off valves 9, 11 and driving the pump 12. Further, if the thrust force of the actuator A1, A2 can be monitored, it is checked whether or not the thrust force of the actuator A1, A2 is generated as indicated by the control command after the warm-up operation.

It should be noted that if it is checked whether or not the thrust force of the actuator A1, A2 is generated as indicated by the control command after the warm-up operation, an error due to the temperature of the hydraulic oil becomes smaller. Thus, there is an advantage that abnormality is more easily detected. That is, in the case of checking the thrust force without performing the warm-up operation, the viscosity of the hydraulic oil is high since the temperature thereof is low and the thrust force of the actuator A1, A2 becomes excessively larger than the control command. Thus, this cannot be detected as abnormality. Contrary to this, it can be suppressed that the thrust force becomes excessive due to the hydraulic oil temperature by performing the warm-up operation in advance. Thus, a threshold value for judging abnormality can be reduced and abnormality can be accurately found out.

Although not shown, the controller C includes, as hardware resources, an A/D converter for receiving a signal output from the acceleration sensor 40, the bandpass filter 41, a storage device such as a ROM (Read Only Memory) storing a program used for processes necessary for the control of the actuators A1, A2 by receiving the lateral acceleration α filtered by the bandpass filter 41 and for the self-diagnosis, an arithmetic device such as a CPU (Central Processing Unit) for performing the processes based on the above program and a storage device such as a RAM (Random Access Memory) for providing a storage area to the CPU.

The control unit 42 of the controller C is realized by executing the program for performing each of the above processes by the CPU. It should be noted that the lateral velocity may be calculated from the lateral acceleration α using an integrator, the lateral acceleration α may be processed by a phase compensation filter after the lateral acceleration α is processed by the bandpass filter 41 and the integrator or may be processed by a filter having a combination of characteristics of the bandpass filter 41, the integrator and the phase compensation filter. The phase compensation filter may be realized by executing the program by the CPU after the process by the bandpass filter 41 and the integrator.

It should be noted that although the controller C calculates the control force command values of the actuators A1, A2 in accordance with the skyhook control law, another control law may be used.

The embodiments of the present invention described above are merely illustration of some application examples of the present invention and not of the nature to limit the technical scope of the present invention to the specific constructions of the above embodiments.

The present application claims a priority based on Japanese Patent Application No. 2011-120599 filed with the Japan Patent Office on May 30, 2011, all the contents of which are hereby incorporated by reference.

The invention claimed is:

1. A vibration control device for railroad vehicles for suppressing the vibration of a vehicle body of a railroad vehicle, comprising an actuator including:
    a cylinder coupled to one of a truck and the vehicle body of the railroad vehicle, a piston slidably inserted in the cylinder, a rod inserted in the cylinder and coupled to the piston and the other of the truck and the vehicle body, a rod-side chamber and a piston-side chamber partitioned in the cylinder by the piston, a tank, a first on-off valve disposed at an intermediate position of a first passage communicating between the rod-side chamber and the piston-side chamber, a second on-off valve disposed at an intermediate position of a second passage communicating between the piston-side chamber and the tank, and a pump for supplying fluid to the rod-side chamber,
    wherein a warm-up operation of the actuator is performed by opening the first and second on-off valves and driving the pump after the vibration control device is started and before a transition is made to a normal control mode for suppressing the vibration of the vehicle body.

2. The vibration control device according to claim 1, wherein:
    the actuator includes a discharge passage connecting the rod-side chamber to the tank, and a variable relief valve disposed at an intermediate position of the discharge passage and capable of changing a valve opening pressure; and
    the valve opening pressure of the variable relief valve is set to be minimum during the warm-up operation.

3. The vibration control device according to claim 1, wherein:
    two or more actuators are provided;
    the two or more actuators include a damper circuit for causing the two or more actuators to function as a damper in a state where the first and second on-off valves are closed; and
    at least one of the two or more actuators is caused to function as a damper during the warm-up operation.

4. The vibration control device according to claim 3, wherein:
    the damper circuit includes a suction passage which permits only a flow of the fluid from the tank toward the piston-side chamber and a rectifying passage which permits only a flow of the fluid from the piston-side chamber toward the rod-side chamber.

5. The vibration control device according to claim 1, wherein:
    the actuator includes two or more actuators that include a damper circuit for causing the actuators to function as a damper in a state where the first and second on-off valves are closed; and at least one of the actuators is caused to function as a damper during the warm-up operation.

6. The vibration control device according to claim 5, wherein:
the damper circuit includes a suction passage which permits only a flow of the fluid from the tank toward the piston-side chamber and a rectifying passage which permits only a flow of the fluid from the piston-side chamber toward the rod-side chamber.

7. A vibration control device for suppressing a vibration of a vehicle body of a railroad vehicle disposed upon a truck, the vibration control device comprising an actuator including:
a cylinder coupled to one of the truck and the vehicle body of the railroad vehicle;
a rod inserted in the cylinder and being coupled to the other of the truck and the vehicle body;
a piston slidably inserted in the cylinder with the rod being coupled to the piston, the piston partitioning the cylinder into a rod-side chamber and a piston-side chamber;
a tank;
a first on-off valve disposed at an intermediate position of a first passage communicating between the rod-side chamber and the piston-side chamber;
a second on-off valve disposed at an intermediate position of a second passage communicating between the piston-side chamber and the tank; and
a pump for supplying fluid to the rod-side chamber,
wherein a warm-up operation of the actuator is performed by opening the first and second on-off valves and driving the pump after the vibration control device is first started from a stopped state where the railroad vehicle is not in service, and before any transition is made to a normal control mode for suppressing the vibration of the vehicle body after the vibration control device is first started.

8. A method of vibration control for suppressing a vibration of a vehicle body of a railroad vehicle disposed upon a truck, the method comprising:
providing a vibration control device having an actuator including:
a cylinder coupled to one of the truck and the vehicle body of the railroad vehicle;
a rod inserted in the cylinder and being coupled to the other of the truck and the vehicle body;
a piston slidably inserted in the cylinder with the rod being coupled to the piston, the piston partitioning the cylinder into a rod-side chamber and a piston-side chamber;
a tank;
a first on-off valve disposed at an intermediate position of a first passage communicating between the rod-side chamber and the piston-side chamber;
a second on-off valve disposed at an intermediate position of a second passage communicating between the piston-side chamber and the tank; and
a pump for supplying fluid to the rod-side chamber;
controlling a warm-up operation of the actuator by opening the first and second on-off valves and driving the pump after the vibration control device is first started from a stopped state where the railroad vehicle is not in service, and before any transition is made to a normal control mode for suppressing the vibration of the vehicle body after the vibration control device is first started.

* * * * *